(12) United States Patent
Okamoto et al.

(10) Patent No.: US 10,578,848 B2
(45) Date of Patent: *Mar. 3, 2020

(54) MEASUREMENT APPARATUS CONFIGURED TO CONTROL THE ON/OFF STATE OF ILLUMINATION SOURCE

(71) Applicant: Sony Corporation, Tokyo (JP)

(72) Inventors: Yoshiki Okamoto, Kanagawa (JP); Masaaki Hara, Tokyo (JP); Terumasa Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 191 days.

This patent is subject to a terminal disclaimer.

(21) Appl. No.: 15/664,457

(22) Filed: Jul. 31, 2017

(65) Prior Publication Data

US 2018/0003936 A1 Jan. 4, 2018

Related U.S. Application Data

(63) Continuation of application No. 14/628,624, filed on Feb. 23, 2015, now Pat. No. 9,746,656.

(30) Foreign Application Priority Data

Mar. 4, 2014 (JP) ................................. 2014-042015

(51) Int. Cl.
 *G02B 21/00* (2006.01)
(52) U.S. Cl.
 CPC ....... *G02B 21/0032* (2013.01); *G02B 21/008* (2013.01); *G02B 21/0052* (2013.01)

(58) Field of Classification Search
 CPC .............. G02B 21/008; G02B 21/0032; G02B 21/0052
 See application file for complete search history.

(56) References Cited

U.S. PATENT DOCUMENTS

| | | | | |
|---|---|---|---|---|
| 6,044,170 A | * | 3/2000 | Migdal | G01B 11/2518 382/154 |
| 9,746,656 B2 | * | 8/2017 | Okamoto | G02B 21/0032 |
| 2009/0122827 A1 | | 5/2009 | Schanz et al. | |
| 2012/0154351 A1 | | 6/2012 | Hicks | |
| 2015/0253558 A1 | | 9/2015 | Okamoto et al. | |

FOREIGN PATENT DOCUMENTS

JP  5307539 B2  10/2013

OTHER PUBLICATIONS

U.S. Appl. No. 14/628,624, filed Feb. 23, 2015, Okamoto et al.

* cited by examiner

*Primary Examiner* — Thanh Luu
(74) *Attorney, Agent, or Firm* — Wolf, Greenfield & Sacks, P.C.

(57) ABSTRACT

There is provided a measurement apparatus including a control unit configured to control an on/off state of illumination that does not contribute to acquisition of measurement data on the basis of an acquisition time period of the measurement data.

16 Claims, 12 Drawing Sheets

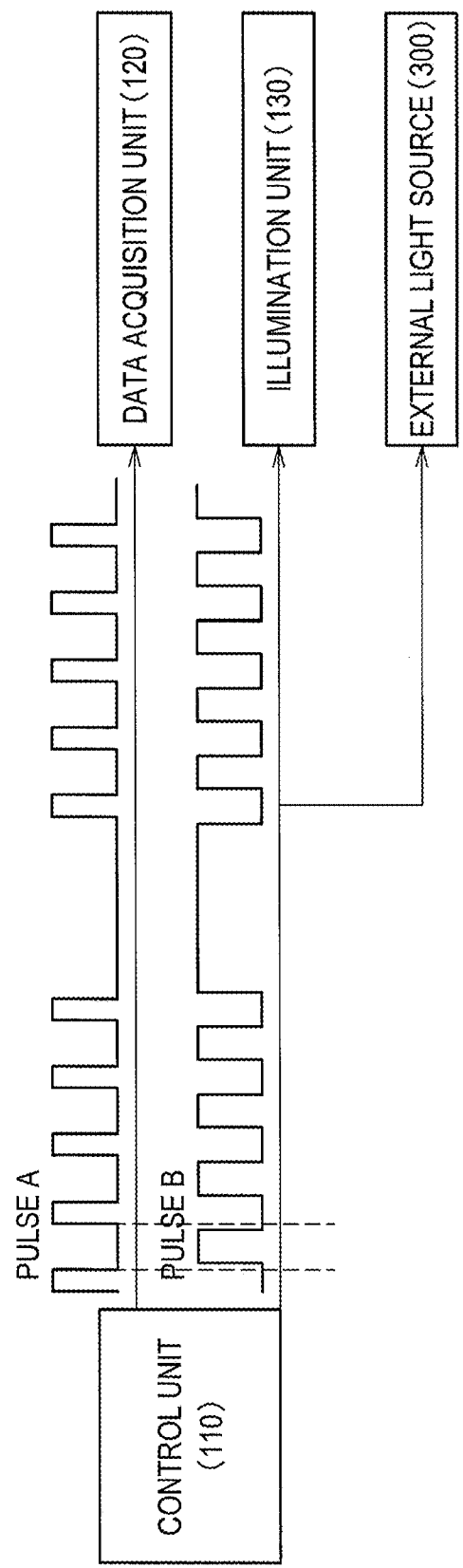

MEASUREMENT APPARATUS CONFIGURED TO CONTROL THE ON/OFF STATE OF ILLUMINATION SOURCE

CROSS REFERENCE TO RELATED APPLICATIONS

This application is a continuation of U.S. patent application Ser. No. 14/628,624, filed on Feb. 23, 2015, which claims the benefit of Japanese Priority Patent Application JP 2014-042015 filed Mar. 4, 2014, the entire contents of which are incorporated herein by reference.

BACKGROUND

The present disclosure relates to a measurement apparatus, a measurement system, a measurement method, and a program.

In recent years, there has been developed a measurement apparatus that acquires data from an object to be measured with high sensitivity and high resolution. As such a measurement apparatus, there is, for example, a laser scanning microscope apparatus. The laser scanning microscope apparatus is a measurement apparatus that scans an object to be measured with a laser, acquires data of intensity of transmitted light, back-scattered light, fluorescence, Raman scattered light, light generated by a nonlinear optical phenomenon, or the like, and generates a two-dimensional or three-dimensional image. As the object to be measured in the measurement apparatus, a biological sample that emits weak light has attracted attention. For example, JP 5307539B discloses an image capturing method and an image capturing apparatus each of which acquires an image of a biological sample that emits weak light.

SUMMARY

However, in such a measurement apparatus, in a case where illumination (e.g., illumination in a room and spotlight for working) that does not contribute to acquisition of measurement data is on, it is difficult in some cases to acquire data from an object to be measured.

Therefore, it is proposed to carry out measurement in a light-shielding environment by covering up an object to be measured with the use of a housing or the like or by placing a measurement apparatus in a darkroom. However, in a case where such a method is employed, it is difficult for a measurer to perform working or processing with respect to the object to be measured, which results in reduction in measurement efficiency. In view of this, it has been demanded to improve the measurement efficiency by acquiring data from an object to be measured while illuminating the object to be measured.

In view of this, according to an embodiment of the present disclosure, there is proposed a measurement apparatus, a measurement system, a measurement method, and a program each of which is novel and improved and is capable of improving the measurement efficiency.

According to an embodiment of the present disclosure, there is provided a measurement apparatus including a control unit configured to control an on/off state of illumination that does not contribute to acquisition of measurement data on the basis of an acquisition time period of the measurement data.

According to another embodiment of the present disclosure, there is provided a measurement apparatus including a detector configured to detect an on/off state of an external light source, and a control unit configured to control acquisition of measurement data on the basis of the on/off state of the external light source.

According to still another embodiment of the present disclosure, there is provided a measurement system including a light source, and a control unit configured to control an on/off state of the light source that does not contribute to acquisition of measurement data on the basis of an acquisition time period of the measurement data.

According to yet another embodiment of the present disclosure, there is provided a measurement method including, by a computer controlling an on/off state of a light source that does not contribute to acquisition of measurement data on the basis of an acquisition time period of the measurement data.

According to a further embodiment of the present disclosure, there is provided a program for causing a computer to function as a control unit configured to control an on/off state of a light source that does not contribute to acquisition of measurement data on the basis of an acquisition time period of the measurement data.

According to an embodiment of the present disclosure, it is possible to acquire data from an object to be measured while illuminating the object to be measured.

As described above, according to an embodiment of the present disclosure, it is possible to improve the measurement efficiency.

According to an embodiment, the measurement apparatus further comprises a detector configured to detect an on/off state of an external light source, wherein the control unit further controls the acquisition of the measurement data in response to the detected on/off state of the external light source.

Note that the present disclosure is not limited to the effect stated above and in addition to or in place of the effect stated above, may achieve any of the effects indicated in this specification or effects that can be understood from the specification.

BRIEF DESCRIPTION OF THE DRAWINGS

FIG. 6 is an explanatory view illustrating an example of a control signal outputted from a control unit in a first control example;

DETAILED DESCRIPTION OF THE EMBODIMENT(S)

Figure 1:
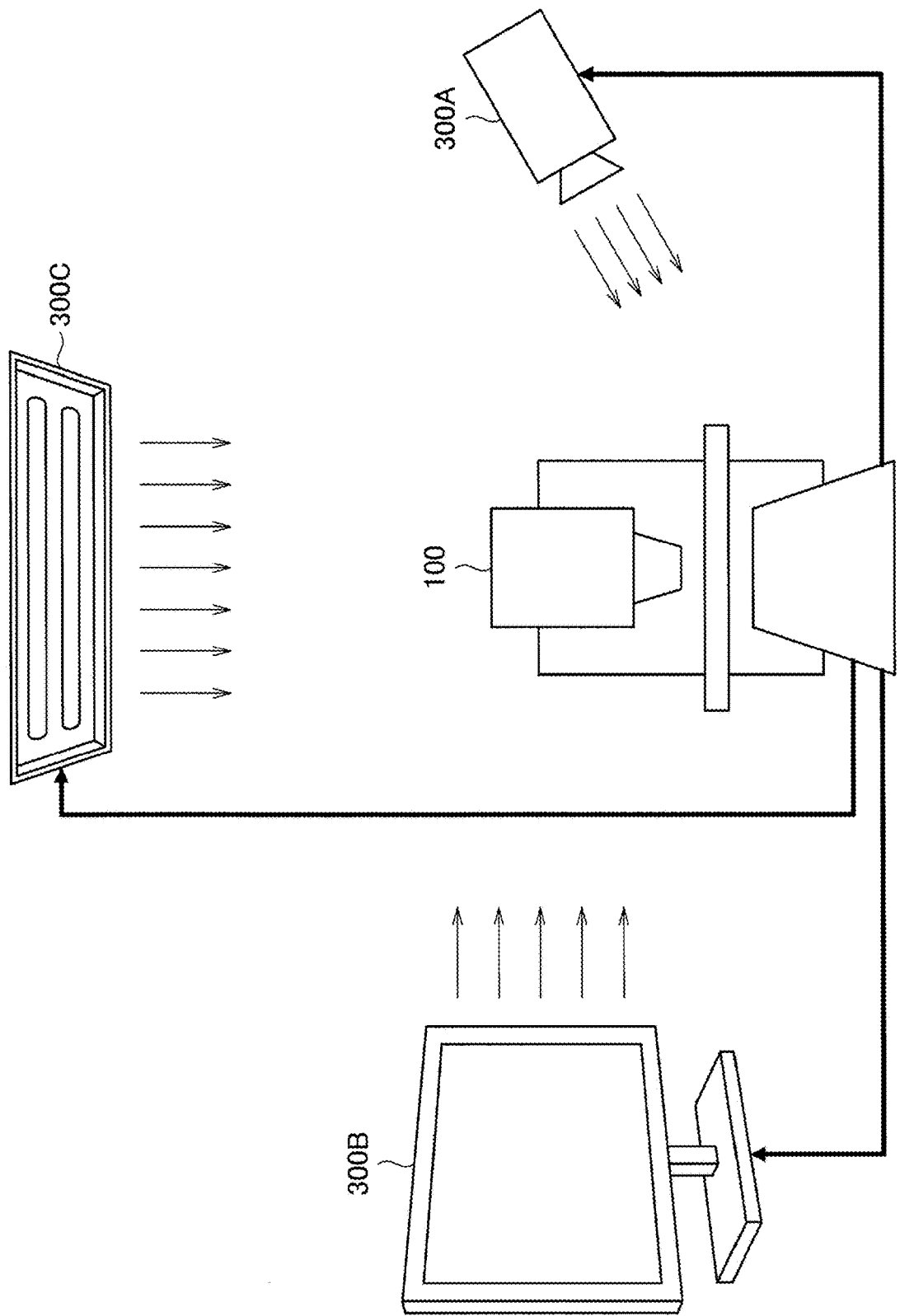
FIG. 1 is an explanatory view illustrating an overview of a measurement system according to First embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. First Embodiment
1.1. Overview of Measurement System
1.2. Structure of Measurement Apparatus
1.3. Control Examples of Measurement Apparatus
1.3.1. First Control Example
1.3.2. Second Control Example
1.3.3. Third Control Example
2. Second Embodiment
2.1. Overview of Measurement System
2.2. Structure of Measurement Apparatus
2.3. Control Example of Measurement Apparatus
3. Summary

1. FIRST EMBODIMENT

[1.1. Overview of Measurement System]

With reference to FIG. 1, there will be described an overview of a measurement system according to First embodiment of the present disclosure. FIG. 1 is an explanatory view illustrating the overview of the measurement system according to First embodiment of the present disclosure.

As illustrated in FIG. 1, the measurement system according to First embodiment of the present disclosure includes a measurement apparatus 100 and light sources 300A, 300B, and 300C.

The light sources 300A, 300B, and 300C are illumination or the like provided outside the measurement apparatus 100. The light sources 300A, 300B, and 300C are connected to the measurement apparatus 100, and an on/off state of each of the light sources 300A, 300B, and 300C is controlled by the measurement apparatus 100 (described later).

Note that the light sources 300A, 300B, and 300C may or may not be light sources for illumination. For example, the light sources may be, for example, display devices having backlight as long as the light sources emit light. As illustrated in FIG. 1, the light sources 300A, 300B, and 300C are, for example, a spotlight (300A) for illuminating a working space of a measurer, a display device (300B) for use in operation of the measurement apparatus 100, and ceiling illumination (300C). However, a technology according to the present disclosure is not limited to those examples.

The measurement apparatus 100 is an apparatus that acquires data from an object to be measured, and is specifically a laser scanning microscope apparatus. The laser scanning microscope apparatus is a measurement apparatus in which a laser is used as a light source and which irradiates an object to be measured while scanning the object to be measured with a converged laser beam, acquires data of intensity of transmitted light, back-scattered light, fluorescence, Raman scattered light, light generated by a nonlinear optical phenomenon, or the like from the object to be measured, and generates an image. The measurement apparatus 100 includes, in addition to the laser, epi-illumination type or transmission type illumination for use in normal observation of the object to be measured with visible light.

In measurement by the measurement apparatus 100 such as the laser scanning microscope apparatus, light from an object to be measured is usually weak. Therefore, in a case where the light sources 300A, 300B, and 300C and the like provided outside are on, light from objects other than the object to be measured is increased. This makes it difficult in some cases to detect light from the object to be measured and acquire measurement data.

For this reason, for example, it is proposed to reduce influence of external light sources by placing the measurement apparatus 100 in a darkroom in which the light sources 300A, 300B, and 300C and the like are not placed. However, in such a case, because a working space is dark, it is difficult for a measurer to perform working or processing with respect to an object to be measured while acquiring measurement data, which results in reduction in measurement efficiency. It is also proposed, for example, to reduce influence of external light sources by covering up an object to be measured with a housing to carry out measurement in a light-shielding environment. However, in such a case, because a measurer and the object to be measured are separated by the housing, it is also difficult for the measurer to perform working or processing with respect to the object to be measured while measurement data is being acquired, which results in reduction in the measurement efficiency.

The inventors has made a technology according to the present disclosure in view of the circumstances. By controlling an on/off state of illumination that does not contribute to acquisition of measurement data on the basis of an acquisition time period of the measurement data, the measurement apparatus 100 according to First embodiment of the present disclosure acquires data from an object to be measured while illuminating the object to be measured. Thus, the measurement apparatus 100 can improve the measurement efficiency of a measurer.

Specifically, the measurement apparatus 100 according to First embodiment of the present disclosure intermittently acquires the measurement data by scanning with a laser. The measurement apparatus 100 controls the light sources 300A, 300B, and 300C that do not contribute to acquisition of measurement data to be in an off state while the measurement data is being acquired and controls the light sources 300A, 300B, and 300C to be in an on state while the measurement data is not being acquired. Note that such control of on/off states of the light sources 300A, 300B, and 300C described above is carried out at a high frequency (e.g., 50 Hz or more) at which a measurer hardly recognizes the control. Therefore, the measurer can perform working and processing with respect to the object to be measured while acquiring the data from the object to be measured without noticing on/off of the light sources 300A, 300B, and 300C.

Herein, the control of the on/off states of the light sources 300A, 300B, and 300C with the use of the measurement apparatus 100 is preferably carried out at a frequency of 50 Hz or more. Although there are individual differences, a limit of a frequency response of human eyes is approximately 50 Hz, and therefore, human eyes hardly recognize a change in the frequency of 50 Hz or more. Thus, by controlling the on/off states of the light sources 300A, 300B, and 300C at the frequency of 50 Hz or more, the measurement apparatus 100 can acquire data from an object to be measured while illuminating the object to be measured without causing a measurer to recognize on/off of the light sources.

The measurement apparatus 100 may control not only the on/off states of the light sources 300A, 300B, and 300C but also an on/off state of the epi-illumination type or transmission type illumination for use in normal observation of the object to be measured with visible light. With this structure, a measurer can simultaneously carry out normal observation with visible light for focusing and adjusting a visual field and acquire measurement data by scanning with a laser. Therefore, the measurement apparatus 100 can further improve the measurement efficiency of the measurer.

[1.2. Structure of Measurement Apparatus]

Figure 2:
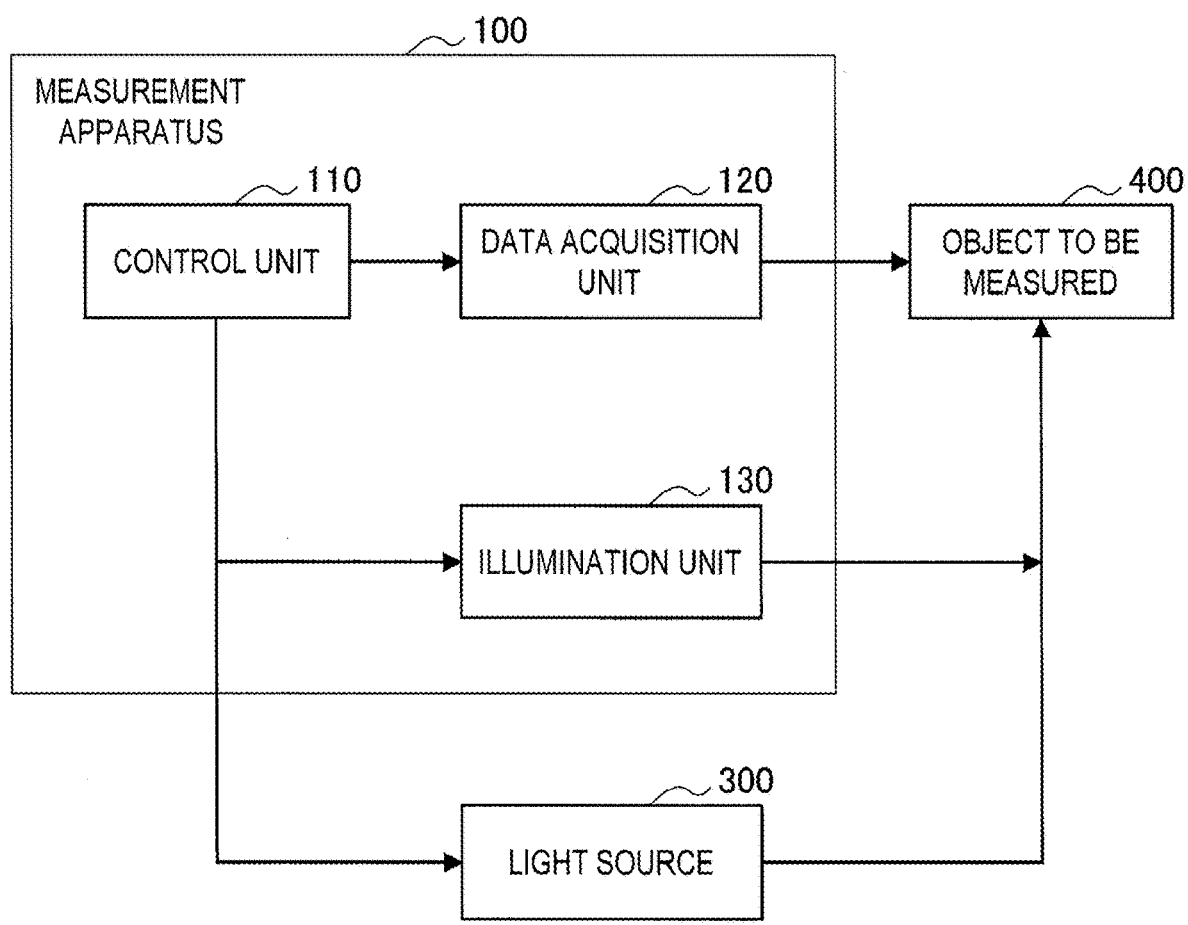
FIG. 2 is an explanatory view illustrating a structure of a measurement apparatus according to First embodiment.

With reference to FIGS. 2 to 4B, there will be described a structure of the measurement apparatus 100 according to First embodiment of the present disclosure. FIG. 2 is an explanatory view illustrating the structure of the measurement apparatus 100 according to First embodiment of the present disclosure. Note that, hereinafter, description will be made by citing a laser scanning microscope apparatus as an example of the measurement apparatus 100.

As illustrated in FIG. 2, the measurement apparatus 100 includes a control unit 110, a data acquisition unit 120, and an illumination unit 130. A light source 300 and an object 400 to be measured are provided outside the measurement apparatus 100.

The control unit 110 controls on/off states of the illumination unit 130 and the light source 300. Specifically, the control unit 110 controls the illumination unit 130 and the light source 300 that do not contribute to acquisition of measurement data to be in an off state while the measurement data is being acquired. The control unit 110 controls the illumination unit 130 and the light source 300 to be in an on state while the measurement data is not being acquired.

Herein, acquisition of the measurement data by the measurement apparatus 100 is intermittently carried out by scanning the object 400 to be measured with a laser. Therefore, the acquisition of the measurement data and turning on of the illumination unit 130 and the light source 300 are substantially carried out alternately.

Note that a specific example of such control of the on/off states of the illumination unit 130 and the light source 300 with the use of the control unit 110 will be described later in [1.3. Control Examples of Measurement Apparatus], however, the control of the on/off states of the illumination unit 130 and the light source 300 with the use of the control unit 110 is preferably carried out at a frequency of 50 Hz or more. Because the limit of the frequency response of human eyes is approximately 50 Hz, with this structure, the control unit 110 can control switching of the on/off states of the illumination unit 130 and the light source 300 without causing a measurer to recognize the switching.

That is, although the acquisition of the measurement data and the illumination of the illumination unit 130 and the light source 300 are alternately carried out, the control unit 110 allows a measurer to recognize that the acquisition of the measurement data and the illumination of the illumination unit 130 and the light source 300 are simultaneously carried out.

The control unit 110 may further control a timing at which the data acquisition unit 120 acquires the measurement data. With this structure, the control unit 110 can control both the timing at which the data acquisition unit 120 acquires the measurement data and a timing at which the on/off states of the illumination unit 130 and the light source 300 is switched. Therefore, the control unit 110 can accurately control both the timings so that light of the illumination unit 130 and the light source 300 does not influence the acquired measurement data.

Note that, for example, the control unit 110 is configured by hardware such as a central processing unit (CPU), a read only memory (ROM), and a random access memory (RAM). Specifically, the CPU functions as a processing unit and a control apparatus and executes control carried out by the control unit 110 in accordance with various programs. The ROM stores a program and an operational parameter used by the CPU, and the RAM temporarily stores a program for use in execution of the CPU, a parameter that appropriately changes in the execution, and the like.

The data acquisition unit 120 includes a laser, an optical system, a photodetector, and the like. The data acquisition unit 120 acquires the measurement data from the object 400 to be measured and generates a two-dimensional or a three-dimensional image of the object to be measured on the basis of the acquired measurement data.

The data acquisition unit 120 may control a laser to irradiate the object 400 to be measured only in a time period in which the measurement data is acquired. With this structure, a time period in which the object 400 to be measured is irradiated with a laser can be minimized, and therefore the data acquisition unit 120 can reduce damage caused by irradiation with a laser to the object 400 to be measured.

Figure 3:
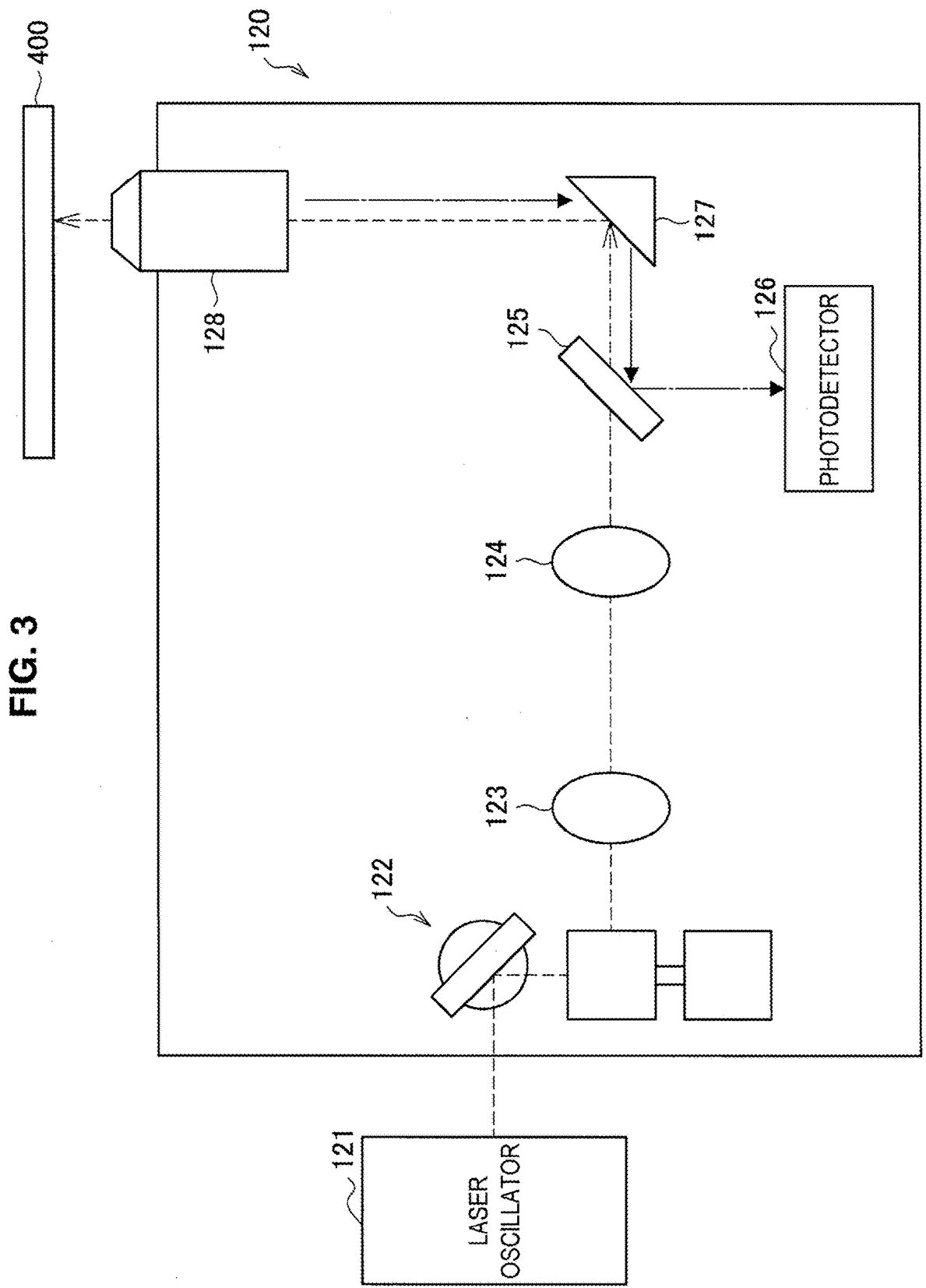
FIG. 3 is an explanatory view illustrating a specific structure of a data acquisition unit according to First embodiment.

With reference to FIG. 3, there will be described a specific structure of the data acquisition unit 120. FIG. 3 is an explanatory view illustrating the specific structure of the data acquisition unit 120.

As illustrated in FIG. 3, the data acquisition unit 120 includes a laser oscillator 121, galvanometer scanners 122, optical systems 123, 124, and 127, a half mirror 125, a photodetector 126, and an objective lens 128.

A laser emitted from the laser oscillator 121 is transmitted through a pair of galvanometer scanners 122 on which a pair of reflection mirrors are mounted and the optical systems 123, 124, and 127, and is incident on the objective lens 128. The laser converged by the objective lens 128 forms a converging spot on the object 400 to be measured. An incident angle on the objective lens 128 can be changed by changing a direction of a laser beam with the use of the galvanometer scanners 122, and therefore, the data acquisition unit 120 can scan the converging spot on the object 400 to be measured.

Reflected light or fluorescence from the object 400 to be measured is detected by the photodetector 126 via the objective lens 128 and the half mirror 125 (or may be a wavelength separation mirror). The data acquisition unit 120 can generate a two-dimensional or three-dimensional image by acquiring a photodetector signal corresponding to a position of the converging spot detected by the photodetector 126.

Hereinafter, the structure of the measurement apparatus 100 will be described again with reference to FIG. 2.

The illumination unit 130 is the epi-illumination type or transmission type illumination included in the measurement apparatus 100 and irradiates the object 400 to be measured in order to carry out normal observation of the object 400 to be measured with visible light. The on/off state of the illumination unit 130 is controlled by the control unit 110. Note that the illumination unit 130 preferably includes a light source having a high response characteristic so that the control unit 110 can control the on/off state thereof at a high frequency (e.g., 50 Hz or more). For example, the illumination unit 130 preferably includes a light emitting diode (LED), an organic electroluminescent element (organic EL element), or the like.

Figure 4A:
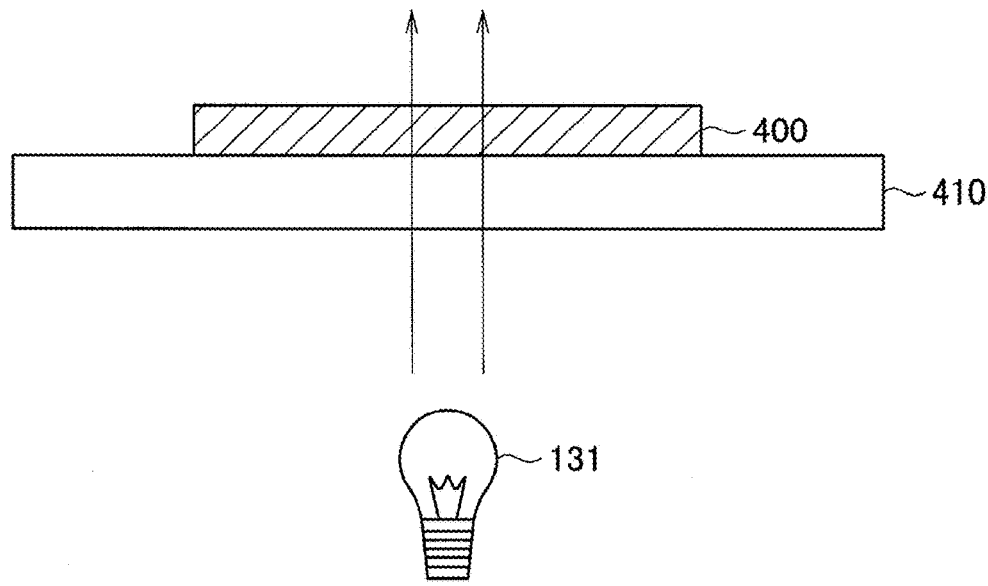
FIG. 4A is an explanatory view illustrating transmission type illumination.
Figure 4B:
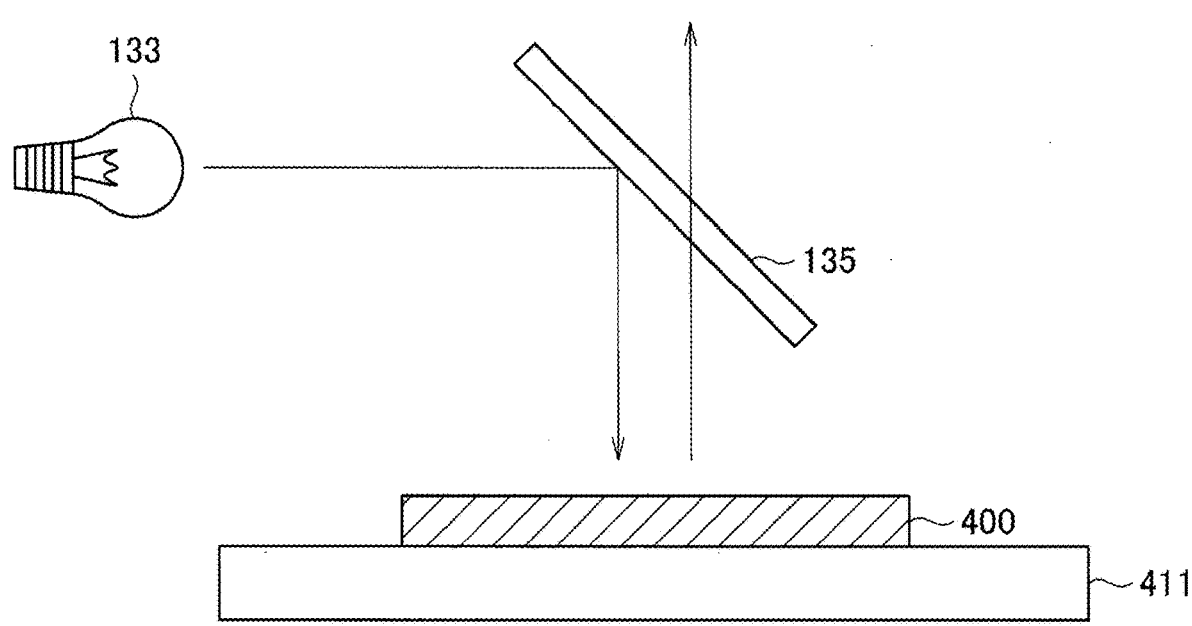
FIG. 4B is an explanatory view illustrating epi-illumination type illumination.

With reference to FIGS. 4A and 4B, there will be described the epi-illumination type illumination and the transmission type illumination. FIG. 4A is an explanatory view illustrating the transmission type illumination, and FIG. 4B is an explanatory view illustrating the epi-illumination type illumination.

As illustrated in FIG. 4A, in the transmission type illumination, light emitted from a light source 131 is transmitted through a transparent substrate 410 and the object 400 to be measured and is led to an optical system for observation. Thus, a measurer observes the object to be measured. Note that the transmission type illumination is mainly used in a case where the object 400 to be measured in a colorless medium is observed or a case where the object 400 to be measured on the transparent substrate 410 is observed.

As illustrated in FIG. 4B, in the epi-illumination type illumination, light emitted from a light source 133 is reflected by a half mirror 135 and irradiates the object 400 to be measured on an opaque substrate 411. The light reflected by the object 400 to be measured is transmitted through the half mirror 135 and is led to an optical system for observation. Thus, a measurer observes the object to be measured. Note that the epi-illumination type illumination is mainly used in a case where the object 400 to be measured which is an opaque object is observed or a case where the object 400 to be measured on the opaque substrate 411 is observed.

Hereinafter, the structure of the measurement apparatus 100 will be described again with reference to FIG. 2.

The light source 300 is a light source provided outside the measurement apparatus 100, and is, for example, a spotlight, a display device, ceiling illumination, or the like, as illustrated in FIG. 1. The light source 300 is connected to the control unit 110 of the measurement apparatus 100, and the on/off state thereof is controlled by the control unit 110. Note that the light source 300, as well as the illumination unit 130, preferably includes a light source having a high response characteristic so that the control unit 110 can control the on/off state thereof at a high frequency (e.g., 50 Hz or more). For example, the light source 300 preferably includes an LED, an organic EL element, or the like. Specifically, in a case where the light source 300 is ceiling illumination, LED illumination is preferable, and, in a case where the light source 300 is a display device, backlight of the display device is preferably an LED.

The object 400 to be measured is an object from which measurement data is acquired by the data acquisition unit 120. In First embodiment of the present disclosure, the object 400 to be measured is not particularly limited. For example, the object 400 to be measured can be a biological sample emitting weak light, a semiconductor sample, and a metal sample.

As described above, the measurement apparatus 100 according to First embodiment of the present disclosure can control the on/off state of the illumination that does not contribute to acquisition of measurement data on the basis of an acquisition time period of the measurement data. Specifically, the measurement apparatus 100 can cause the illumination that does not contribute to the acquisition of the measurement data to be in the off state while the measurement data is being acquired and can cause the illumination to be in the on state while the measurement data is not being acquired.

Because the measurement apparatus 100 according to First embodiment of the present disclosure controls switching of the illumination at a high frequency at which humans hardly recognize the switching, the measurement apparatus 100 can acquire data from the object 400 to be measured while illuminating the object 400 to be measured. Therefore, the measurement apparatus 100 according to First embodiment of the present disclosure allows a measurer to perform working or processing with respect to the object 400 to be measured while acquiring data from the object to be measured. This can improve the measurement efficiency.

The measurement apparatus 100 according to First embodiment of the present disclosure can also control the on/off state of the epi-illumination type or transmission type illumination included therein in the same way as described above. Therefore, according to the measurement apparatus 100 according to First embodiment of the present disclosure, a measurer can simultaneously carry out normal observation with visible light for focusing and adjusting a visual field and acquire measurement data by scanning with a laser. This can improve the measurement efficiency.

[1.3. Control Examples of Measurement Apparatus]

With reference to FIGS. 5 to 9, there will be described control examples of acquisition of data and illumination in the measurement apparatus 100 according to First embodiment of the present disclosure.

1.3.1. First Control Example

Figure 5:
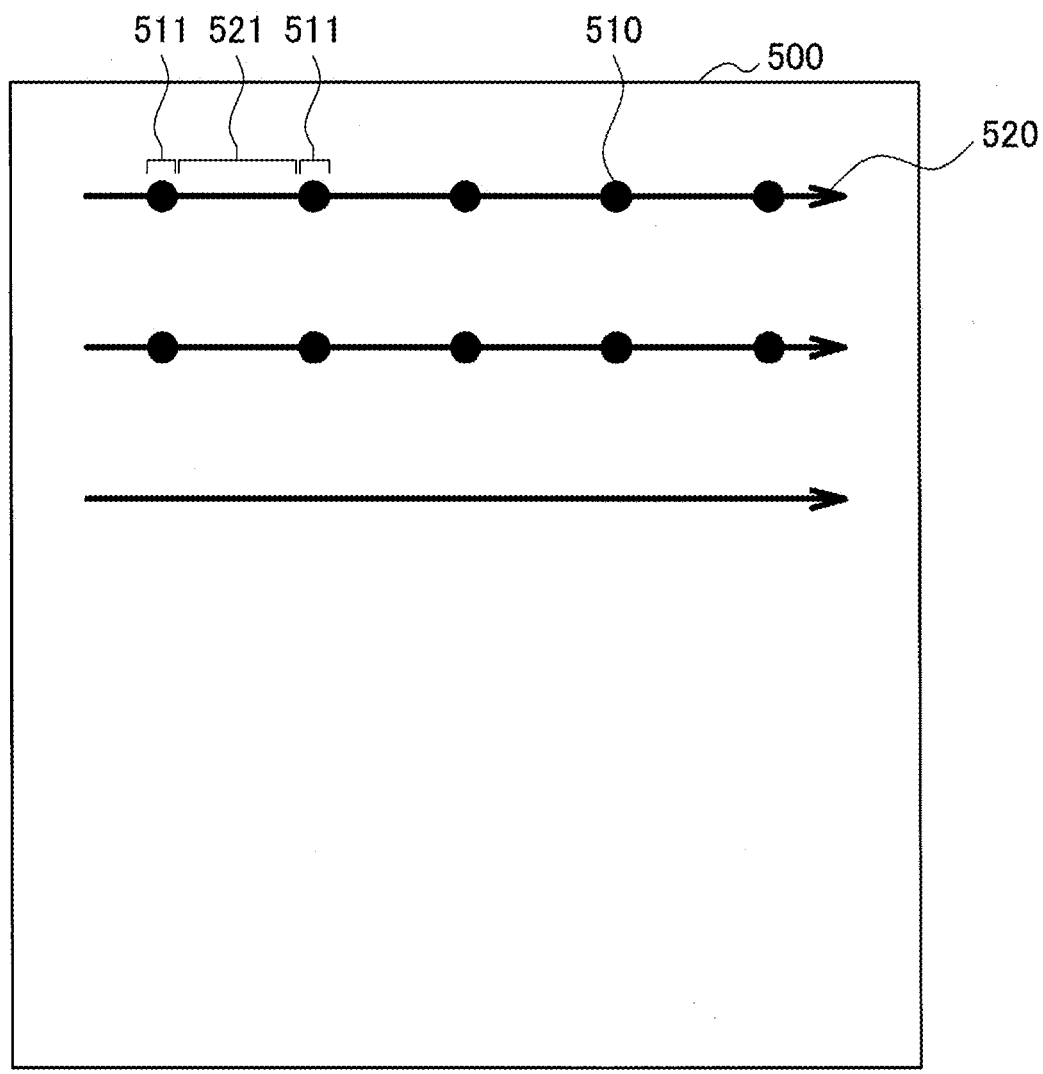
FIG. 5 is an explanatory view illustrating timings of acquisition of data and illumination in a first control example.

With reference to FIGS. 5 and 6, there will be described a first control example of the measurement apparatus 100 according to First embodiment of the present disclosure. FIG. 5 is an explanatory view illustrating timings of acquisition of data and illumination in the first control example.

In FIG. 5, a region 500 is a region in which measurement data is acquired by the measurement apparatus 100. In the region 500, a plurality of measuring points 510 from which the measurement data is acquired are arranged, and the measurement apparatus 100 carries out scanning with a laser along scanning lines 520 passing through the measuring points 510, thereby acquiring the measurement data from the measuring points 510.

For example, in FIG. 5, the measuring points 510 are arranged in matrix in the region 500, and the scanning lines 520 are located from left to right to pass through five measuring points 510. The plurality of scanning lines 520 are arranged to pass through the measuring points 510 in a direction (vertical direction) orthogonal to a direction of the scanning lines 520 (horizontal direction). Therefore, the measurement apparatus 100 acquires the measurement data from the measuring points 510 along the scanning lines 520, thereby acquiring the measurement data from the measuring points 510 in the whole region 500. Thus, the measurement apparatus 100 can generate an image corresponding to the region 500. Note that the measurement apparatus 100 repeatedly acquires measurement data from the region 500 and repeatedly generates an image corresponding to the region 500.

Specifically, the region 500 corresponds to a single frame of an image that the laser scanning microscope apparatus has acquired by scanning with a laser. Each of the measuring points 510 corresponds to a pixel of the acquired image and each of the scanning lines 520 corresponds to a line in a scanning direction of the acquired image. Note that arrangement of the measuring points 510 and the scanning lines 520 illustrated in FIG. 5 is merely an example, and a technology of the present disclosure is not limited to the above example. For example, the measuring points 510 may be arranged in a honeycomb pattern in which regular hexagon shapes are arranged with no gap. The direction of the scanning lines 520 is not limited to the horizontal direction, and the scanning lines 520 may be curved.

In the first control example, the measurement apparatus 100 defines a time period in which the measurement data is acquired from the measuring points 510 as an off time period 511 and controls each illumination (light source 300 and illumination unit 130) to be in the off state. The measurement apparatus 100 defines a time period in which the measurement data is not acquired between the measuring points 510 as an on time period 521 and controls each illumination (light source 300 and illumination unit 130) to be in the on state.

According to the first control example, the measurement apparatus 100 can control the off time period 511 and the on time period 521 to be alternated in each illumination. The measurement apparatus 100 can control a repetition frequency of the off time period 511 and the on time period 521 of the illumination to be higher than a frame rate of an image generated by the laser scanning microscope apparatus. The frame rate of the image generated by the laser scanning microscope apparatus is a frequency (e.g., 50 Hz) at which flickering of the image is not recognized, and therefore, the measurement apparatus 100 can switch the on/off state of the illumination without causing a measurer to recognize such switching.

FIG. 6 illustrates an example of a control signal outputted by the control unit 110 in the first control example. As illustrated in FIG. 6, a pulse A of a control signal is outputted to the data acquisition unit 120 from the control unit 110, and a pulse B of a control signal is outputted to the light source 300 and the illumination unit 130 from the control unit 110. Note that, in FIG. 6, a high pulse indicates a data acquisition state or an on state and a low pulse indicates a data non-acquisition state or an off state.

As illustrated in FIG. 6, the pulse A outputted to the data acquisition unit 120 and the pulse B outputted to the light source 300 and the illumination unit 130 have forms in which high and low are inverted. Note that a single pulse in the pulse A corresponds to acquisition of measurement data from a single measuring point 510, and a low time period after five pulses corresponds to a time period between a scanning line and and another scanning line.

Herein, it is preferable to have a gap by delaying a timing at which a pulse in the pulse B rises from a timing at which a pulse in the pulse A falls. It is also preferable to have a gap by delaying a timing at which a pulse in the pulse A rises from a timing at which the pulse in the pulse B falls.

Actual switching of the on/off states of the light source 300 and the illumination unit 130 does not correspond to a pulse waveform in some cases due to limitation of a response characteristic of the light source 300 and the illumination unit 130. Therefore, by providing the gaps, it is preferable to satisfactorily reduce influence of light from the light source 300 and the illumination unit 130 on the acquired measurement data. Note that the gaps may be set to predetermined values or may be set based on a noise level of a pulse or the like.

FIG. 6 illustrates an example where switching of the on/off states of the plurality of light sources 300 and the illumination unit 130 is controlled with a single pulse B, however, a technology of the present disclosure is not limited to the above example. The control unit 110 may optimize pulses for controlling switching of the on/off states thereof and output the pulses to the light sources 300 and the illumination unit 130.

1.3.2. Second Control Example

Figure 7A:
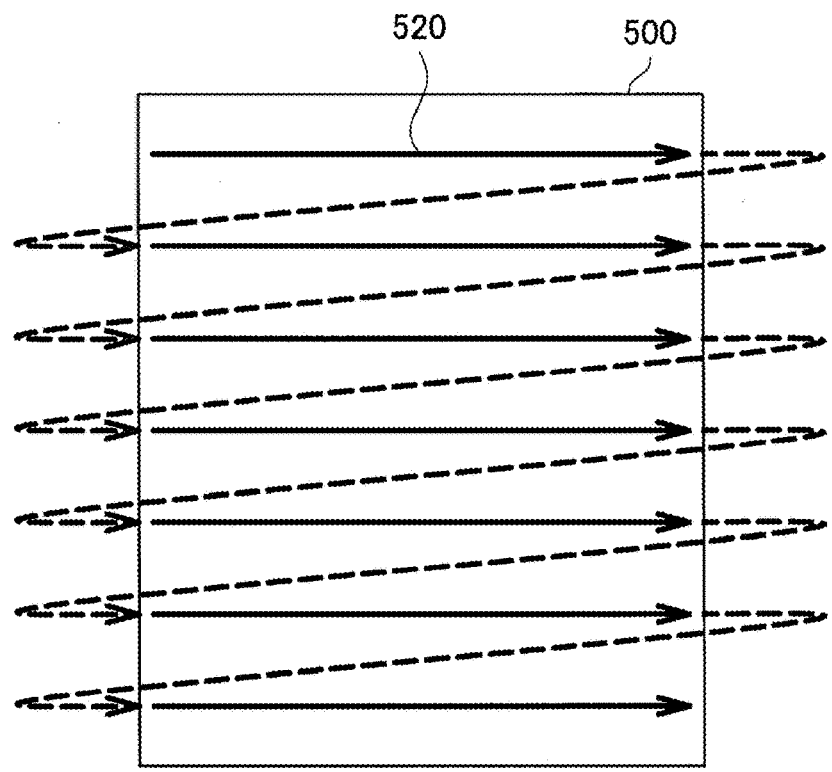
FIG. 7A is an explanatory view illustrating an example of timings of acquisition of data and illumination in a second control example.
Figure 7B:
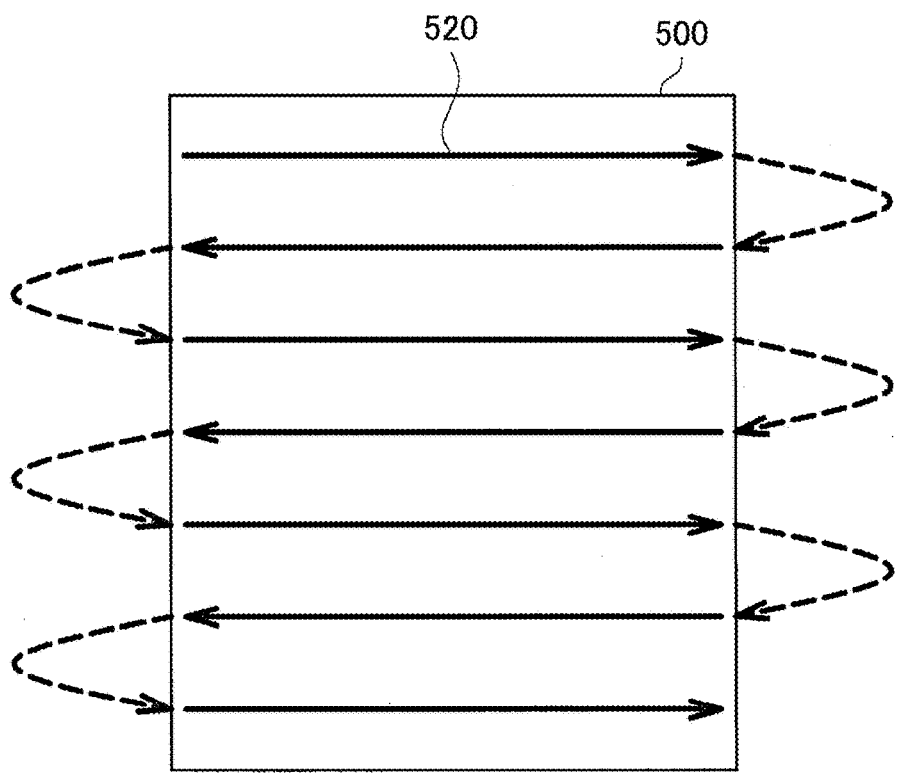
FIG. 7B is an explanatory view illustrating another example of timings of acquisition of data and illumination in a second control example.
Figure 8:
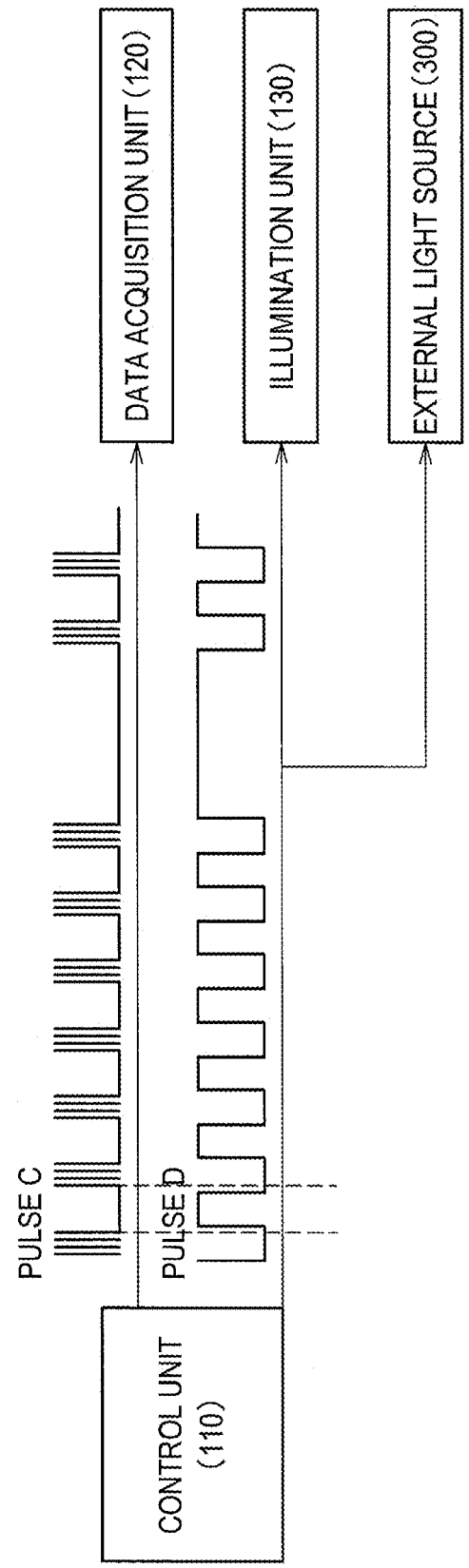
FIG. 8 is an explanatory view illustrating an example of a control signal outputted from a control unit in a second control example.

With reference to FIG. 7A to FIG. 8, there will be described a second control example of the measurement apparatus 100 according to First embodiment of the present disclosure. FIG. 7A is an explanatory view illustrating an example of timings of acquisition of data and illumination in the second control example, and FIG. 7B is an explanatory view illustrating another example of timings of acquisition of data and illumination in the second control example.

In FIG. 7A, in the region 500, the measuring points 510 and the scanning lines 520 are arranged as described with reference to FIG. 5, and measurement data is similarly acquired.

Herein, in the second control example, the measurement apparatus 100 defines a time period in which the measurement data is acquired from the scanning lines 520 as an off time period and controls each illumination (light source 300 and illumination unit 130) to be in the off state. The measurement apparatus 100 defines a time period in which the measurement data is not acquired between the scanning lines 520 as an on time period and controls each illumination (light source 300 and illumination unit 130) to be in the on state. Specifically, in FIG. 7A, each illumination is controlled to be in the off state in the time period in which the measurement data is acquired from the scanning lines 520 indicated by solid lines. Further, each illumination is controlled to be in the on state in the time period indicated by broken lines between the scanning lines 520.

With reference to FIG. 7B, there will be described another example of timings of acquisition of data and illumination in the second control example. The example illustrated in FIG. 7B is different from the example illustrated in FIG. 7A in that directions of the scanning lines 520 are alternately in parallel to each other. However, in the example illustrated in FIG. 7B is similar to the example illustrated in FIG. 7A in that each illumination can be controlled to be in the off state in a time period in which the measurement data is acquired in the scanning lines 520 indicated by solid lines. Further, each illumination can be controlled to be in the on state in a time period indicated by broken lines between the scanning lines.

According to the second control example, the measurement apparatus 100 can control the off time period and the on time period to be alternated in each illumination. The measurement apparatus 100 can control a repetition frequency of the off time period and the on time period of the illumination to be higher than a frame rate of an image generated by the laser scanning microscope apparatus. The frame rate of the image generated by the laser scanning microscope apparatus is a frequency (e.g., 50 Hz) at which flickering of the image is hardly recognized, and therefore, the measurement apparatus 100 can switch the on/off state of the illumination without causing a measurer to recognize such switching.

In the second control example, a frequency for switching the on/off state of the illumination can be set to be higher than the frequency at which flickering of the image is recognized but is lower than a frequency for switching the on/off state of the illumination in the first control example. With this structure, the second control example has higher acceptability of a response characteristic with respect to each illumination, as compared with the first control example. Therefore, the second control example is more preferable.

FIG. 8 illustrates an example of a control signal outputted by the control unit 110 in the second control example. As illustrated in FIG. 8, a pulse C of a control signal is outputted to the data acquisition unit 120 from the control unit 110, and a pulse D of a control signal is outputted to the light source 300 and the illumination unit 130 from the control unit 110. Note that, in FIG. 8, as well as FIG. 6, a high pulse indicates a data acquisition state or an on state and a low pulse indicates a data non-acquisition state or an off state.

As illustrated in FIG. 8, in a case where the pulse C outputted to the data acquisition unit 120 is high, the pulse D outputted to the light source 300 and the illumination unit 130 is controlled to be low, meanwhile, in a case where the pulse C is low, the pulse D is controlled to be high. Note that, in the pulse C, a pulse group having four pulses corresponds to acquisition of measurement data in a single scanning line, and a low time period after seven pulse groups corresponds to a time period between a frame and a next frame.

Note that, in the second control example, as well as the first control example, it is preferable to have a gap by delaying a timing at which a pulse in the pulse D rises from a timing at which a last pulse of a pulse group in the pulse C falls. It is also preferable to have a gap by delaying a timing at which a first pulse of a pulse group in the pulse C rises from a timing at which the pulse in the pulse D falls. Note that the gaps may be set to predetermined values or may be set based on a noise level of the pulse or the like.

FIG. 8 illustrates an example where switching of the on/off states of the light source 300 and the illumination unit 130 is controlled with a single pulse D, however, a technology of the present disclosure is not limited to the above example. The control unit 110 may optimize pulses for controlling switching of the on/off states thereof and output the pulses to the light source 300 and the illumination unit 130.

1.3.3. Third Control Example

Figure 9:
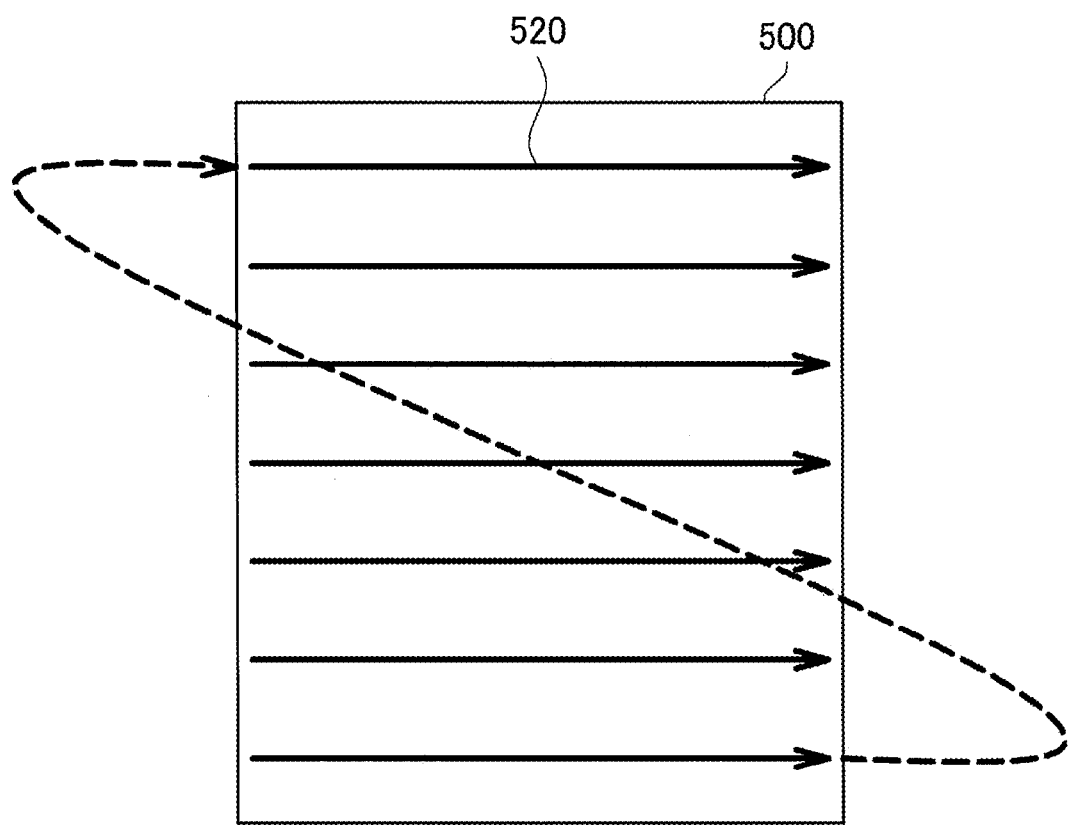
FIG. 9 is an explanatory view illustrating an example of timings of acquisition of data and illumination in a third control example.

With reference to FIG. 9, there will be described a third control example of the measurement apparatus 100 according to First embodiment of the present disclosure. FIG. 9 is an explanatory view illustrating an example of timings of acquisition of data and illumination in the third control example.

In FIG. 9, in the region 500, the measuring points 510 and the scanning lines 520 are arranged as described with reference to FIG. 5, and measurement data is similarly acquired.

Herein, in the third control example, the measurement apparatus 100 defines a time period in which the measurement data is acquired in the region 500 as an off time period and controls each illumination (light source 300 and illumination unit 130) to be in the off state. The measurement apparatus 100 defines a time period in which the measurement data is not acquired between frames in the region 500 as an on time period and controls each illumination (light source 300 and illumination unit 130) to be in the on state. Specifically, in FIG. 9, each illumination is controlled to be in the off state in the time period in which the measurement data is acquired in the scanning lines 520 indicated by solid lines in the whole region 500. Further, each illumination is controlled to be in the on state in the time period indicated by broken lines between the frames in the region 500.

According to the third control example, the measurement apparatus 100 can control the off time period and the on time period to be alternated in each illumination. The measurement apparatus 100 can set a repetition frequency of the off time period and the on time period of the illumination to have a same value as that of a frame rate of an image generated by the laser scanning microscope apparatus. The frame rate of the image generated by the laser scanning microscope apparatus is a frequency (e.g., 50 Hz) at which flickering of the image is hardly recognized, and therefore, the measurement apparatus 100 can switch the on/off state of the illumination without causing a measurer to recognize such switching.

Note that, in order not to cause a measurer to recognize the switching of the on/off state of the illumination, the repetition frequency in the off time period and the on time period of the illumination is preferably higher than the frame rate of the image. Therefore, the first and second control examples are more preferable than the third control example.

Note that, in the measurement apparatus 100 according to First embodiment of the present disclosure, the switching of the on/off state of the illumination can be also controlled by combining the first to third control examples. Specifically, the measurement apparatus 100 may switch the on/off state of the illumination between the measuring points 510, between the scanning lines 520, and between frames of images.

2. SECOND EMBODIMENT

[2.1. Overview of Measurement System]

Figure 10:
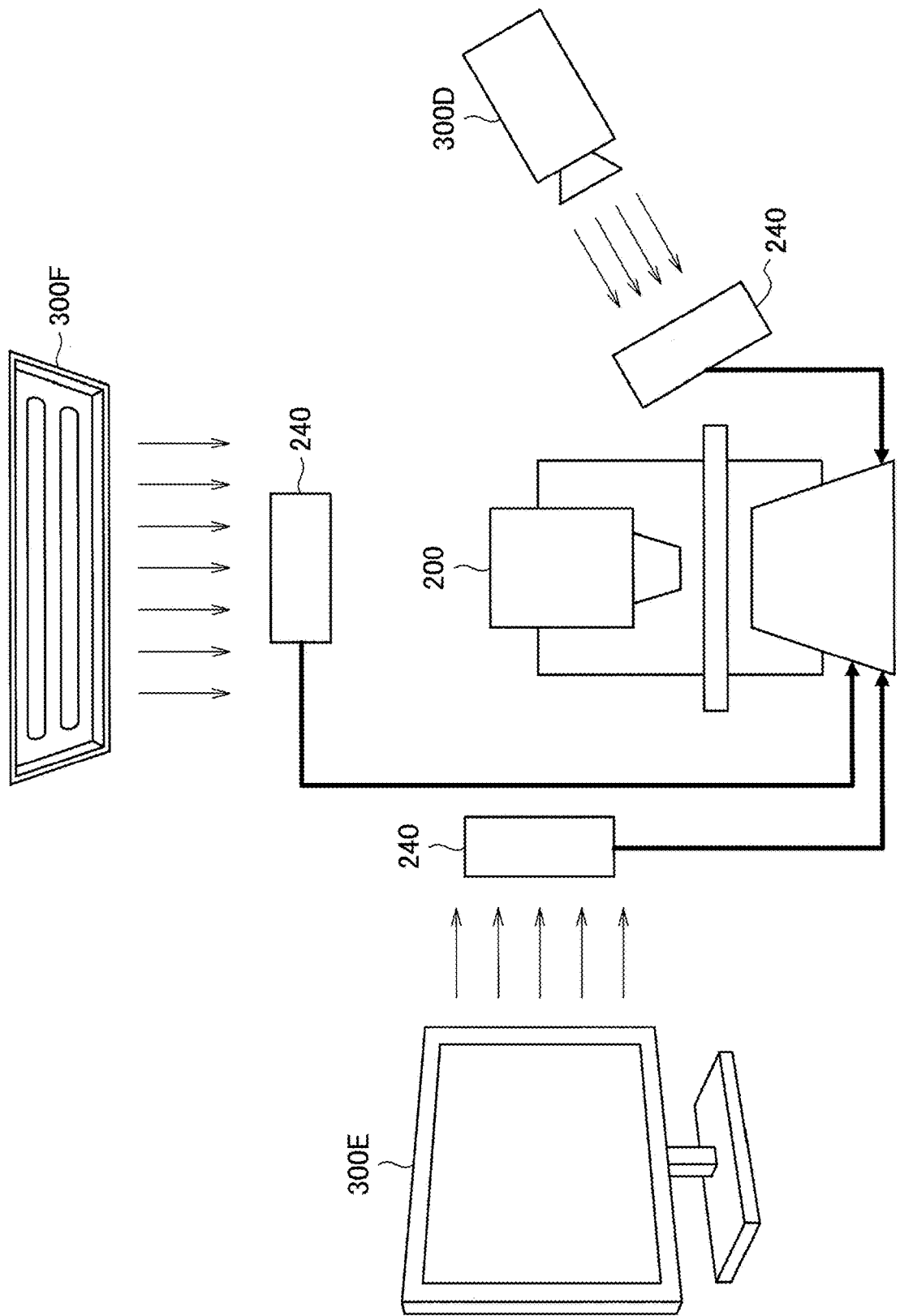
FIG. 10 is an explanatory view illustrating an overview of a measurement system according to Second embodiment of the present disclosure.

With reference to FIG. 10, there will be described an overview of a measurement system according to Second embodiment of the present disclosure. FIG. 10 is an explanatory view illustrating the overview of the measurement system according to Second embodiment of the present disclosure.

As illustrated in FIG. 10, the measurement system according to Second embodiment of the present disclosure includes a measurement apparatus 200, detectors 240, and light sources 300D, 300E, and 300F.

The light sources 300D, 300E, and 300F are illumination or the like independently provided outside the measurement apparatus 200. The light sources 300D, 300E, and 300F are preferably turned on/off at a high frequency (e.g., 50 Hz).

Note that the light sources 300D, 300E, and 300F may or may not be light sources for illumination. For example, the light sources may be, for example, display devices having backlight as long as the light sources emit light. As illustrated in FIG. 10, the light sources 300D 300E, and 300F are, for example, a spotlight (300D) for illuminating a working space of a measurer, a display device (300E) for use in operation of the measurement apparatus 200, and ceiling illumination (300F). However, a technology according to the present disclosure is not limited to those examples.

The detectors 240 are detectors that detect on/off states of the light sources 300D, 300E, and 300F, respectively. Specifically, the detectors 240 are provided for the respective light sources provided outside the measurement apparatus 200 and detect the on/off states of the light sources and send detection results to the measurement apparatus 200.

The measurement apparatus 200 is specifically a laser scanning microscope apparatus, which is similar to First embodiment. Note that the measurement apparatus 200 according to Second embodiment is different from the measurement apparatus 100 according to First embodiment in that acquisition of measurement data is controlled on the basis of the on/off states of the light sources 300D, 300E, and 300F detected by the detectors 240, instead of control of the on/off states of the light sources 300D, 300E, and 300F.

By detecting on/off states of external light sources and controlling acquisition of measurement data on the basis of detection results, the measurement apparatus 200 according to Second embodiment of the present disclosure acquires data from an object to be measured while illuminating the object to be measured. Thus, the measurement apparatus 200 can improve the measurement efficiency of a measurer.

Specifically, the measurement apparatus 200 according to Second embodiment of the present disclosure detects the on/off states of the external light sources with the use of detectors and acquires measurement data in a case where all the light sources are in an off state. Therefore, the measurement apparatus 200 acquires the data from the object to be measured while illuminating the object to be measured. Thus, the measurement apparatus 200 can improve the measurement efficiency.

[2.2. Structure of Measurement Apparatus]

Figure 11:
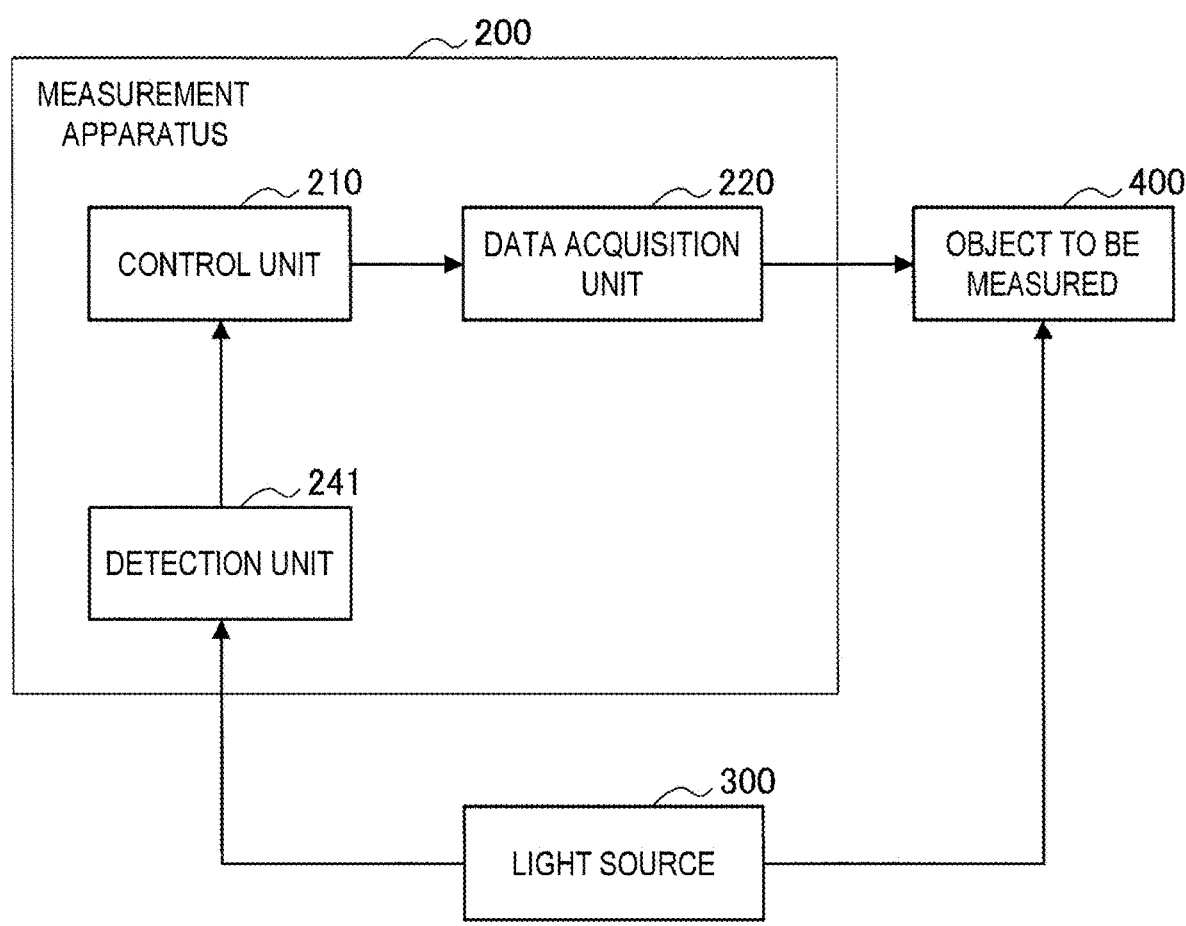
FIG. 11 is an explanatory view illustrating a structure of a measurement apparatus according to Second embodiment.

With reference to FIG. 11, there will be described a structure of the measurement apparatus 200 according to Second embodiment of the present disclosure. FIG. 11 is an explanatory view illustrating the structure of the measurement apparatus 200 according to Second embodiment of the present disclosure. Note that, hereinafter, description will be made by citing a laser scanning microscope apparatus as the measurement apparatus 200.

As illustrated in FIG. 11, the measurement apparatus 200 includes a control unit 210, a data acquisition unit 220, and a detection unit 241. A light source 300 and an object 400 to be measured are provided outside the measurement apparatus 100. Herein, the data acquisition unit 220 is substantially similar to the data acquisition unit 120 described with reference to FIG. 2, and the object 400 to be measured is substantially similar to the object 400 to be measured described with reference to FIG. 2, and therefore, description thereof is herein omitted.

The control unit 210 controls a timing at which the data acquisition unit 220 acquires measurement data on the basis of the on/off state of the light source 300 detected by the detection unit 241. Specifically, the control unit 210 controls the data acquisition unit 220 to acquire the measurement data in a case where the detection unit 241 detects that the light source 300 is in an off state.

For example, in a case where the light source 300 is turned on/off at a high frequency, human eyes hardly recognize on/off of the light source 300, however, there exists a time period in which the light source 300 is in the off state. In view of this, the control unit 210 detects the time period in which the light source 300 is in the off state with the use of the detection unit 241 on the basis of a light amount thereof and controls the data acquisition unit 220 to acquire measurement data in the time period in which the light source 300 is in the off state.

Note that, in a case where a plurality of light sources 300 exist, the control unit 210 detects a time period in which all the light sources 300 are in an off state with the use of the detection unit 241 on the basis of a light amount thereof and controls the data acquisition unit 220 to acquire measurement data in the time period in which all the light sources 300 are in the off state.

With this structure, the control unit 210 can acquire the measurement data from the object 400 to be measured while illuminating the object 400 to be measured. Therefore, the control unit 210 allows a measurer to acquire the measurement data while performing working or processing with respect to the object 400 to be measured. This can improve the measurement efficiency.

Note that the control unit 210, as well as the control unit 110 of First embodiment, is configured by hardware such as a CPU, a ROM, and a RAM. Specifically, the CPU functions as a processing unit and a control apparatus and executes control carried out by the control unit 210 in accordance with various programs. The ROM stores a program and an operational parameter used by the CPU, and the RAM temporarily stores a program for use in execution of the CPU, a parameter that appropriately changes in the execution, and the like.

The detection unit 241 detects the on/off state of the light source 300 and sends a detection result to the control unit 210. For example, the detection unit 241 may detect the on/off state of the light source 300 by measuring the light amount thereof. A plurality of detectors 241 may be provided for the light sources 300, respectively, or a single detection unit 241 may be provided for a plurality of light sources 300.

The light source 300 is a light source independently provided outside the measurement apparatus 200, and is, for example, a spotlight, a display device, or ceiling illumination, as illustrated in FIG. 10. For example, the light source 300 is preferably turned on/off at a high frequency (e.g., 50 Hz or more) such as fluorescent light. The light source 300 preferably includes an LED, an organic EL element, or the like having a high response characteristic.

As described above, the measurement apparatus 200 according to Second embodiment of the present disclosure can control a timing at which measurement data is acquired on the basis of the on/off state of the light source 300. That is, the measurement apparatus 200 can control the measurement data not to be acquired while the light source 300 is in the on state and the measurement data to be acquired while the light source 300 is in the off state.

Therefore, the measurement apparatus 200 according to Second embodiment of the present disclosure can illuminate the object 400 to be measured while acquiring data from the object 400 to be measured. Thus, the measurement apparatus 200 according to Second embodiment of the present disclosure allows a measurer to perform working or processing with respect to the object 400 to be measured while acquiring the data from the object 400 to be measured. This can improve the measurement efficiency.

The measurement apparatus 200 according to Second embodiment of the present disclosure can be combined with First embodiment. Specifically, the measurement apparatus 200 detects the on/off state of the light source 300 with the use of the detection unit 241 and controls, on the basis of the detected on/off state of the light source 300, acquisition of measurement data, the on/off state of illumination unit 130 in First embodiment, and an on/off state of another/other light source(s).

Depending on a frequency, a phase, and a duty ratio of on/off, in a case where the number of light sources 300 is increased, a time period in which all the light sources 300 are in the off state is reduced. Therefore, in order to improve the measurement efficiency, it is more preferable that, for example, the measurement apparatus 200 control an on/off state of another/other light source(s) in accordance with an on/off state of a single light source 300.

[2.3. Control Example of Measurement Apparatus]

Figure 12:
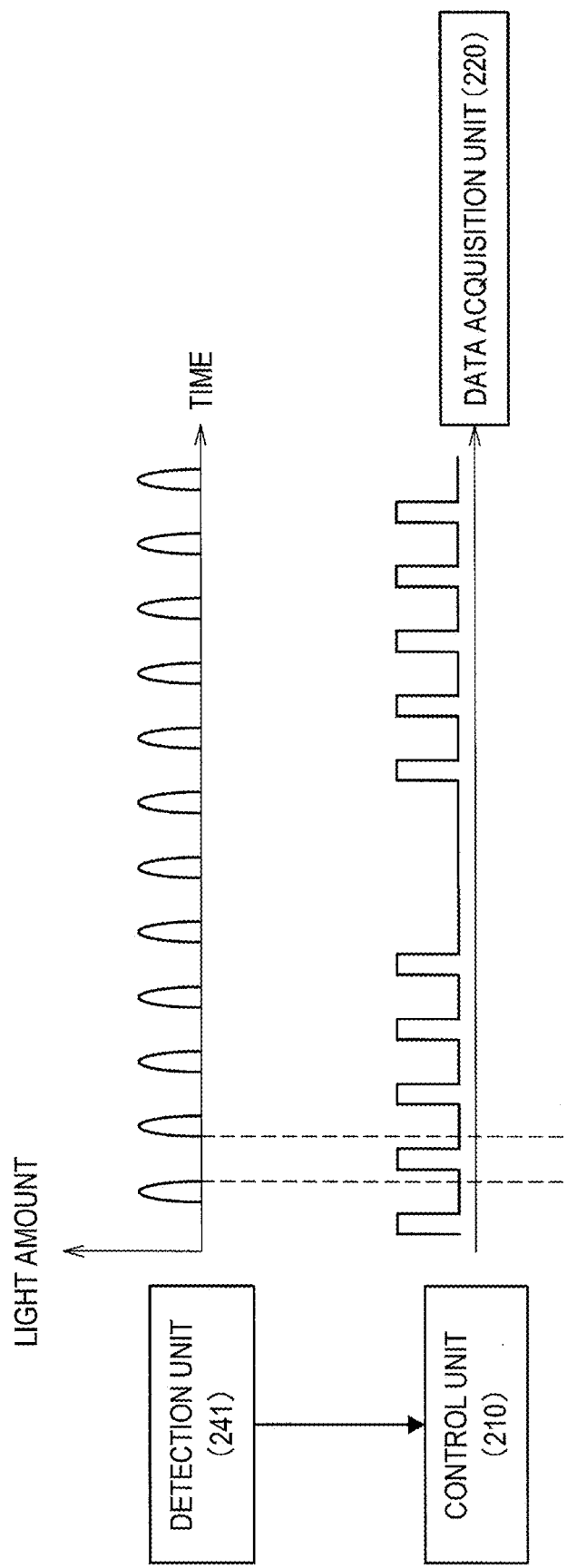
FIG. 12 is an explanatory view illustrating an example of a control signal outputted from a control unit of a measurement apparatus in Second embodiment.

With reference to FIG. 12, there will be described a control example of acquisition of data in the measurement apparatus 200 according to Second embodiment of the present disclosure. FIG. 12 illustrates an example of a control signal outputted by the control unit 210 of the measurement apparatus 200 in Second embodiment.

As illustrated in FIG. 12, the detection unit 241 detects a light amount emitted from the light source 300 and sends a detection result to the control unit 210. Herein, the light source 300 is turned on/off at a high frequency. The control unit 210 that has received the detection result from the detection unit 241 outputs a pulse of a control signal to the data acquisition unit 220 on the basis of the detection result. Note that, in a pulse in a lower part of FIG. 12, a high pulse indicates a data acquisition state and a low pulse indicates a data non-acquisition state.

As illustrated in FIG. 12, the pulse outputted to the data acquisition unit 220 from the control unit 210 is controlled to be high in a case where the light amount of the light source 300 is not detected (i.e., the light source 300 is in the off state), meanwhile, the pulse is controlled to be low in a case where the light amount of the light source 300 is detected (i.e., the light source 300 is in the on state). Note that, in FIG. 12, for example, a single pulse corresponds to one-time acquisition of the measurement data and a low time period after five pulses corresponds to a time period between a scanning line and another scanning line.

A pulse outputted to the data acquisition unit 220 from the control unit 210 preferably rises after a predetermined gap since the light amount emitted from the light source 300 has not been detected and preferably falls before a predetermined gap from detection of the light amount of the light source 300. In a case where the control unit 210 controls the pulse by providing the gaps, it is possible to further reduce influence of light emitted from the light source 300 on measurement data. Note that the gaps may be set to predetermined values or may be set based on a response characteristic of the light source 300 determined based on a change ratio of the light amount.

3. CONCLUSION

As described above, by controlling the on/off state of the illumination on the basis of an acquisition time period of measurement data or by controlling the acquisition time period of the measurement data on the basis of the on/off state of the illumination, the measurement apparatus according to Embodiments of the present disclosure can acquire data from an object to be measured while illuminating the object to be measured. Therefore, according to the measurement apparatus according to Embodiments of the present disclosure, a measurer can perform working or processing with respect to the object to be measured while measuring the object to be measured. This can improve the measurement efficiency.

The measurement apparatus according to Embodiments of the present disclosure can control the on/off state of the epi-illumination type or transmission type illumination for use in normal observation of the object to be measured with visible light on the basis of the acquisition time period of the measurement data. With this structure, a measurer can simultaneously carry out normal observation with visible light for focusing and adjusting a visual field and acquire measurement data by scanning with a laser. This can improve the measurement efficiency.

Note that the measurement apparatus according to Embodiments of the present disclosure is, for example, a laser scanning microscope apparatus, however, the measurement apparatus is more preferably a multiphoton excitation laser scanning microscope apparatus. The multiphoton excitation laser scanning microscope apparatus is a measurement apparatus that measures weak fluorescence from an object to be measured excited by multiphoton excitation and generates an image. Therefore, the multiphoton excitation laser scanning microscope apparatus is desired to carry out measurement in an environment in which light other than the weak fluorescence from the object to be measured is satisfactorily reduced. The measurement apparatus according to Embodiments of the present disclosure can satisfactorily reduce light other than light from an object to be measured by controlling the illumination that does not contribute to acquisition of measurement data to be in the off state while the measurement data is being acquired. Therefore, the multiphoton excitation laser scanning microscope apparatus is more preferable as the measurement apparatus according to Embodiments of the present disclosure.

The measurement apparatus according to Embodiments of the present disclosure is not limited to the above laser scanning microscope apparatus. For example, the measurement apparatus according to Embodiments of the present disclosure is applicable to a measurement apparatus for operation used when a fluorescent part is cut while fluorescence observation is being carried out.

It should be understood by those skilled in the art that various modifications, combinations, sub-combinations and alterations may occur depending on design requirements and other factors insofar as they are within the scope of the appended claims or the equivalents thereof.

It is also possible to fabricate a computer program for causing hardware such as the CPU, ROM, and RAM built in the measurement apparatus according to the present embodiment of the present disclosure to implement the same functions as each of the above-mentioned components of the measurement apparatus. There is also provided a storage medium having the computer program stored therein.

In addition, the effects described in the present specification are merely illustrative and demonstrative, and not limitative. In other words, the technology according to the present disclosure can exhibit other effects that are evident to those skilled in the art along with or instead of the effects based on the present specification. Additionally, the present technology may also be configured as below.

(1) A measurement apparatus including:
a control unit configured to control an on/off state of illumination that does not contribute to acquisition of measurement data on the basis of an acquisition time period of the measurement data.

(2) The measurement apparatus according to (1),
wherein the measurement apparatus acquires the measurement data by scanning an object to be measured with a laser, and further includes a data acquisition unit that generates an image on the basis of the measurement data.

(3) The measurement apparatus according to (2),
wherein the control unit turns on the illumination between acquisition of measurement data corresponding to a pixel of the generated image and acquisition of measurement data corresponding to another pixel of the generated image.

(4) The measurement apparatus according to (2) or (3),
wherein the control unit turns on the illumination between acquisition of measurement data corresponding to a scanning line of the generated image and acquisition of measurement data corresponding to another scanning line of the generated image.

(5) The measurement apparatus according to any one of (2) to (4),
wherein the data acquisition unit successively generates images, and
wherein the control unit turns on the illumination between acquisition of measurement data corresponding to one of the images and acquisition of measurement data corresponding to a next one of the images.

(6) The measurement apparatus according to any one of (2) to (5),
wherein the data acquisition unit controls irradiation of the object to be measured with a laser on the basis of the acquisition time period of the measurement data.

(7) The measurement apparatus according to any one of (1) to (6), further including:
an illumination unit configured to carry out epi-illumination type or transmission type illumination with respect to the object to be measured,
wherein the control unit switches an on/off state of the illumination unit as the illumination.

(8) The measurement apparatus according to any one of (1) to (7),
wherein the control unit switches an on/off state of a light source as the illumination, the light source being included in an external device.

(9) The measurement apparatus according to any one of (1) to (8),
wherein the control unit switches the on/off state of the illumination at a frequency of 50 Hz or more.

(10) The measurement apparatus according to any one of (1) to (9), further including:
a detector configured to detect an on/off state of an external light source,
wherein the control unit further controls the acquisition of the measurement data on the basis of a light amount of the external light source.

(11) A measurement apparatus including:
a detector configured to detect an on/off state of an external light source; and
a control unit configured to control acquisition of measurement data on the basis of the on/off state of the external light source.

(12) A measurement system including:
a light source; and
a control unit configured to control an on/off state of the light source that does not contribute to acquisition of measurement data on the basis of an acquisition time period of the measurement data.

(13) A measurement method including, by a computer:
controlling an on/off state of a light source that does not contribute to acquisition of measurement data on the basis of an acquisition time period of the measurement data.

(14) A program for causing a computer to function as a control unit configured to control an on/off state of a light source that does not contribute to acquisition of measurement data on the basis of an acquisition time period of the measurement data.

What is claimed is:

1. A light source control device comprising:
a circuitry configured to control a first light source to irradiate an object to be measured based on a signal for controlling a timing of irradiation between the first light source and a second light source; and
a data acquisition unit configured to generate an image on the basis of measurement data;
wherein a control unit turns on the second light source between acquisition of measurement data corresponding to a pixel of a generated image and acquisition of measurement data corresponding to another pixel of the generated image.

2. The light source control device according to claim 1, wherein measurement data is acquired by irradiating, with the first light source, the object to be measured and detecting, using a light detector, light reflected from the object to be measured.

3. The light source control device according to claim 2, wherein the timing of irradiation between the first light source and the second light source corresponds to a time period during which measurement data is acquired.

4. The light source control device according to claim 3, wherein the first light source is activated and the second light source is deactivated during the time period during which measurement data is acquired.

5. The light source control device according to claim 3, wherein the first light source is deactivated and the second light source is activated during a time period during which measurement data is not acquired.

6. A measurement apparatus that acquires measurement data by irradiating an object to be measured with a first light source, and detects, using a light detector, light reflected from the object, comprising:
a control unit configured to control, on the basis of an acquisition time period of the measurement data, an on/off state of the first light source and a second light source that does not contribute to acquisition of measurement data, wherein, in response to a control signal, the control unit:
activates the first light source and deactivates the second light source when the measurement apparatus is in the acquisition time period of the measurement data; and
deactivates the first light source and activates the second light source when the measurement apparatus is not in the acquisition time period of the measurement data; and
a data acquisition unit configured to generate an image on the basis of the measurement data;
wherein the control unit turns on the second light source between acquisition of measurement data corresponding to a pixel of a generated image and acquisition of measurement data corresponding to another pixel of the generated image.

7. The measurement apparatus according to claim 6, wherein the control unit turns on the second light source between acquisition of measurement data corresponding to a scanning line of the generated image and acquisition of measurement data corresponding to another scanning line of the generated image.

8. The measurement apparatus according to claim 6, wherein the data acquisition unit successively generates images, and wherein the control unit turns on the second light source between acquisition of measurement data corresponding to one of the images and acquisition of measurement data corresponding to a next one of the images.

9. The measurement apparatus according to claim 6, further comprising an illumination unit configured to carry out epi-illumination type illumination or transmission type illumination with respect to the object to be measured, wherein the control unit switches an on/off state of the illumination unit as the illumination.

10. The measurement apparatus according to claim 6, wherein the control unit switches an on/off source of the first or second light source as illumination, the first or second light source being included in an external device.

11. The measurement apparatus according to claim 6, wherein the first light source is a laser.

12. A measurement device, comprising:
a control unit configured to control an on/off state of illumination that does not contribute to acquisition of measurement data on the basis of an acquisition time period of the measurement data, wherein:
the measurement device acquires the measurement data by irradiating an object to be measured with a laser and detects, using a light detector, light reflected from the object;
a control unit activates the irradiating of the object with the laser and deactivates the illumination when the measurement apparatus is in the acquisition time period of the measurement data; and
the control unit deactivates the irradiating of the object with the laser and activates the illumination when the measurement apparatus is not in the acquisition time period of the measurement data; and
a data acquisition unit configured to generate an image on the basis of the measurement data;
wherein the control unit turns on the illumination between acquisition of measurement data corresponding to a pixel of a generated image and acquisition of measurement data corresponding to another pixel of the generated image.

13. The measurement device according to claim 12, wherein the control unit turns on the illumination between acquisition of measurement data corresponding to a scanning line of the generated image and acquisition of measurement data corresponding to another scanning line of the generated image.

14. The measurement device according to claim 12, wherein the data acquisition unit successively generates images, and wherein the control unit turns on the illumination between acquisition of measurement data corresponding to one of the images and acquisition of measurement data corresponding to a next one of the images.

15. The measurement device according to claim 12, further comprising an illumination unit configured to carry out epi-illumination type illumination or transmission type illumination with respect to the object to be measured, wherein the control unit switches an on/off state of the illumination unit as the illumination.

16. The measurement device according to claim 12, wherein the control unit switches an on/off source of a light source as the illumination, the light source being included in an external device.

* * * * *